(12) United States Patent
Takahashi et al.

(10) Patent No.: US 10,718,340 B2
(45) Date of Patent: Jul. 21, 2020

(54) GAS TURBINE MANUFACTURING METHOD

(71) Applicant: Mitsubishi Hitachi Power Systems, Ltd., Nishi-ku, Yokohama (JP)

(72) Inventors: Yasuo Takahashi, Yokohama (JP); Takanori Shibata, Yokohama (JP); Yasunori Kimura, Yokohama (JP); Chihiro Myoren, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 180 days.

(21) Appl. No.: 15/559,164

(22) PCT Filed: Apr. 11, 2016

(86) PCT No.: PCT/JP2016/061717
§ 371 (c)(1),
(2) Date: Sep. 18, 2017

(87) PCT Pub. No.: WO2016/167223
PCT Pub. Date: Oct. 20, 2016

(65) Prior Publication Data
US 2018/0066662 A1     Mar. 8, 2018

(30) Foreign Application Priority Data

Apr. 14, 2015 (JP) .................. 2015-082277

(51) Int. Cl.
*F04D 19/02* (2006.01)
*F04D 29/54* (2006.01)
(Continued)

(52) U.S. Cl.
CPC ............... *F04D 19/02* (2013.01); *F02C 3/04* (2013.01); *F02C 3/06* (2013.01); *F02C 3/22* (2013.01);
(Continued)

(58) Field of Classification Search
CPC ...... F04D 19/02; F04D 29/661; F04D 29/542; F04D 29/54; F04D 29/66; F02C 3/04;
(Continued)

(56) References Cited

U.S. PATENT DOCUMENTS

| 4,948,331 A | 8/1990 | Roy et al. |
| 6,196,795 B1 * | 3/2001 | Jahr ...................... F01D 25/28 |
| | | 248/554 |

(Continued)

FOREIGN PATENT DOCUMENTS

| EP | 1 528 240 A2 | 5/2005 |
| EP | 1 862 655 A1 | 12/2007 |

(Continued)

OTHER PUBLICATIONS

International Search Report (PCT/ISA/210) issued in PCT Application No. PCT/JP2016/061717 dated Jun. 14, 2016 with English translation (Two (2) pages).

(Continued)

*Primary Examiner* — Sarang Afzali
(74) *Attorney, Agent, or Firm* — Crowell & Moring LLP (57) ABSTRACT

In a gas turbine manufacturing method for manufacturing a derivative gas turbine having a different cycle from a reference gas turbine including a reference compressor, a compressor of the derivative gas turbine is designed to add at least one additional stage further on an upstream side than a last stage of the reference compressor and on a downstream side of a bleed slit of a bleed chamber of the reference compressor, the compressor of the derivative gas turbine is manufactured on the basis of the design, and the derivative gas turbine is manufactured. Consequently, it is possible to manufacture a gas turbine that can secure a surge margin of a compressor with respect to fluctuation in the composition of fuel.

8 Claims, 5 Drawing Sheets

(51) Int. Cl.
  *F04D 29/66* (2006.01)
  *F02C 3/22* (2006.01)
  *F02C 6/08* (2006.01)
  *F02C 3/06* (2006.01)
  *F02C 3/04* (2006.01)
(52) U.S. Cl.
  CPC ............... *F02C 6/08* (2013.01); *F04D 29/54* (2013.01); *F04D 29/66* (2013.01); *F04D 29/661* (2013.01); *F04D 29/542* (2013.01); *F05D 2220/32* (2013.01); *F05D 2220/3216* (2013.01); *F05D 2220/72* (2013.01); *F05D 2230/50* (2013.01); *F05D 2230/80* (2013.01); *F05D 2240/40* (2013.01); *Y02E 20/16* (2013.01); *Y10T 29/49238* (2015.01)
(58) Field of Classification Search
  CPC ...... F02C 3/06; F02C 3/22; F02C 6/08; F02C 7/00; F02C 7/04; F05D 2220/32; F05D 2230/50; F05D 2220/3216; F05D 2240/40; F05D 2230/80; F05D 2220/72; F01D 25/00; Y02E 20/16; Y10T 29/49236; Y10T 29/49238; Y10T 29/49245
  See application file for complete search history.

(56) References Cited

U.S. PATENT DOCUMENTS

| | | | | |
|---|---|---|---|---|
| 6,199,366 | B1* | 3/2001 | Murata | F02C 3/22 60/734 |
| 7,913,495 | B2* | 3/2011 | Kishibe | F01K 21/047 29/889.2 |
| 2008/0247885 | A1 | 10/2008 | Hagen | |
| 2012/0163965 | A1 | 6/2012 | Takahashi et al. | |
| 2013/0064651 | A1 | 3/2013 | Ollivau | |
| 2013/0269357 | A1* | 10/2013 | Wichmann | F02C 3/34 60/772 |
| 2014/0250902 | A1* | 9/2014 | Kraft | F02C 6/16 60/773 |
| 2015/0027131 | A1* | 1/2015 | Takeda | B23P 6/00 60/805 |

FOREIGN PATENT DOCUMENTS

| | | |
|---|---|---|
| EP | 2 472 127 A2 | 7/2012 |
| EP | 2 833 001 A1 | 2/2015 |
| JP | 11-22486 A | 1/1999 |
| JP | 2012-137072 A | 7/2012 |
| JP | 2015-25428 A | 2/2015 |
| RU | 2012 130 774 A | 1/2014 |

OTHER PUBLICATIONS

Japanese-language Written Opinion (PCT/ISA/237) issued in PCT Application No. PCT/JP2016/061717 dated Jun. 14, 2016 (Four (4) pages).
Extended European Search Report issued in counterpart European Application No. 16780014.3 dated Oct. 17, 2018 (ten pages).
Russian Search Report issued in counterpart Russian Application No. 2017133006/06(058073) dated Oct. 18, 2018 with English translation (four (4) pages).
Russian-language Office Action issued in counterpart Russian Application No. 2017133006/06(058073) dated Oct. 19, 2018 with English translation (15 pages).
Inozemcev A.A. et al., Principle of Design of Aircraft Engines and Power Plants, Moscow, Mashinostroenie, 2008, vol. 1, pp. 90-95, 118, Figs. 2.12 and 2.14 (eight (8) pages).
Dvigatel magazine, 4(88), 2013, "CFM56 Engine and all about it . . . ", www.dvigately.ru, pp. 12-15 (five (5) pages).
International Preliminary Report on Patentability (PCT/IB/338 & PCT/IB/373) issued in PCT Application No. PCT/JP2016/061717 dated Oct. 26, 2017, including English translation of document C2 (Japanese-language Written Opinion (PCT/ISA/237)) previously filed on Sep. 18, 2017 (Seven (7) pages).
Japanese-language Office Action issued in counterpart Japanese Application No. 2015-082277 dated Nov. 6, 2018 with English translation (seven (7) pages).

* cited by examiner

GAS TURBINE MANUFACTURING METHOD

TECHNICAL FIELD

The present invention relates to a gas turbine manufacturing method.

BACKGROUND ART

In general, in a gas turbine that burns a low-calorie blast furnace gas (hereinafter, blast furnace gas turbine), in order to obtain a predetermined turbine output, the low-calorie blast furnace gas large in quantity compared with a normal liquefied natural gas (LNG) is supplied to a combustor as fuel. Therefore, a working fluid amount in the turbine increases compared with gas turbines of a simple cycle (a standard cycle for using kerosene, gas oil, natural gas, or the like as fuel and not performing humidification of an intake air) and a combined cycle. Therefore, when the blast furnace gas turbine is designed and manufactured from the gas turbine of the simple cycle or the combined cycle already designed, a working fluid amount in a compressor is reduced to maintain a balance among a turbine output, and a generator output and compressor power.

However, when the working fluid amount in the compressor is reduced, a pressure ratio of the compressor decreases. Therefore, for example, it is necessary to take some measure for increasing the pressure ratio of the compressor as disclosed in Patent Literature 1.

PRIOR ART LITERATURE

Patent Literature

Patent Literature 1: JP-A-11-22486

SUMMARY OF THE INVENTION

Problem to be Solved by the Invention

In the blast furnace gas turbine, since the composition of the blast furnace gas supplied to the combustor always fluctuates, the calorie and the temperature of the fuel change. For example, if the calorie of the blast furnace gas decreases, when a fuel flow rate is increased to keep the turbine output constant according to the decrease in the calorie of the blast furnace gas, the pressure ratio of the compressor increases and a surge margin decreases. If the temperature of the blast furnace gas rises, an intake air temperature of the gas compressor rises and the power of the gas compressor increases. At this point, when the fuel flow rate for increasing the turbine output is increased, the pressure ratio of the compressor increases and the surge margin of the compressor decreases. Therefore, when the blast furnace gas turbine is designed and manufactured, it is necessary and indispensable from the viewpoint of wide serviceability and high reliability to secure the surge margin (tolerance to surging) of the compressor from a design stage.

Incidentally, as a method of increasing a pressure ratio and a surge pressure ratio of a compressor already designed, there is a method of redesigning all blades taking into account serviceability. However, since this method is synonymous with designing a compressor anew, a design period and a design cost increase. Moreover, since the method is not different from the new design, it is necessary to prove blade reliability. An extremely long period is required for development when this process is included in the development.

There is also a method of adding a blade stage on an upstream side of an initial stage of the compressor. However, in this method, when the pressure ratio and the surge pressure ratio increase, a working fluid flow rate also increases at the same time. Therefore, it is difficult to apply the method to the blast furnace gas turbine.

The present invention has been devised in view of the above and an object of the present invention is to provide a gas turbine manufacturing method that can secure a surge margin of a compressor with respect to fluctuation in the composition of fuel.

Means for Solving the Problem

In order to achieve the object, the present invention provides a gas turbine manufacturing method for manufacturing a derivative gas turbine having a different cycle from a reference gas turbine including a reference compressor. The gas turbine manufacturing method includes: designing a compressor of the derivative gas turbine to add at least one additional stage further on an upstream side than a last stage of the reference compressor and on a downstream side of a bleed slit of a bleed chamber of the reference compressor; and manufacturing the compressor of the derivative gas turbine on the basis of the design and manufacturing the derivative gas turbine.

Effect of the Invention

According to the present invention, it is possible to provide a gas turbine manufacturing method that can secure a surge margin of a compressor with respect to fluctuation in the composition of fuel.

MODES FOR CARRYING OUT THE INVENTION

First Embodiment

An embodiment of the present invention for designing or manufacturing a derivative gas turbine from a reference gas turbine is explained below with reference to the drawings. First, the derivative gas turbine is a target object of design or manufacturing according to the present invention. Representative examples of the derivative gas turbine are a blast furnace gas turbine and the like. However, models other than these gas turbines could also be included in the derivative gas turbine. The reference gas turbine is a gas turbine forming a basis of design or manufacturing of the derivative gas turbine. Besides an existing gas turbine, design data of gas turbines designed or manufactured in the past is also included in the reference gas turbine. A most universal example of the reference gas turbine is a single axis gas turbine of a simple cycle. However, the reference gas turbine is not always limited to the single axis gas turbine. Depending on a type of the derivative gas turbine, gas turbines of other types such as a combined cycle and a two axis gas turbine could be the reference gas turbine.

1. Reference Machine

The reference gas turbine (a reference machine) is explained.

Figure 1:
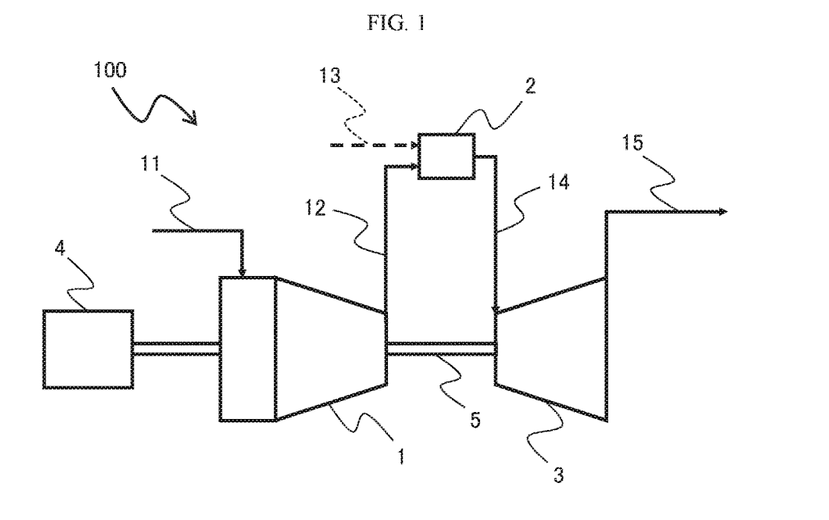
FIG. 1 is a schematic diagram of a reference machine according to a first embodiment of the present invention.

FIG. 1 is a schematic diagram of a reference machine according to this embodiment. As shown in FIG. 1, a reference machine 100 includes a compressor (a reference compressor) 1, a combustor 2, and a turbine 3.

The reference compressor 1 compresses working fluid (air) 11 sucked via an intake section (not shown in the figure) to generate high-pressure compressed air 12 and supplies the high-pressure compressed air 12 to the combustor 2. The combustor 2 mixes and burns the compressed air obtained by the reference compressor 1 and fuel 13, generates high-temperature combustion gas 14, and supplies the high-temperature combustion gas 14 to the turbine 3. The combustion gas 14 obtained from the combustor 2 expands, whereby the turbine 3 is driven. The reference compressor 1 is driven by power obtained by the turbine 3. A generator 4 is driven by the remaining power and electric power is obtained. The combustion gas 14 that has driven the turbine 3 is emitted from the turbine 3 as exhaust gas 15. In this embodiment, the reference compressor 1, the turbine 3, and the generator 4 are coupled to one another by a rotating shaft 5.

In a reference compressor 100 having a constant volume flow rate and a constant number of revolutions generally used in the reference machine 100, when the temperature of the air 11 rises, for example, in summer, the density of the air 11 decreases and a mass flow rate of the air 11 sucked by the reference compressor 1 decreases. Therefore, a flow rate of the fuel 13 supplied to the combustor 2 also has to decrease according to the decrease in the mass flow rate of the air 11. Therefore, in the reference machine 100, as the temperature of the air 11 sucked into the reference compressor 1 is higher, an output of the turbine 3 further decreases.

2. Derivative Machine

The derivative gas turbine (a derivative machine) is explained.

Figure 2:
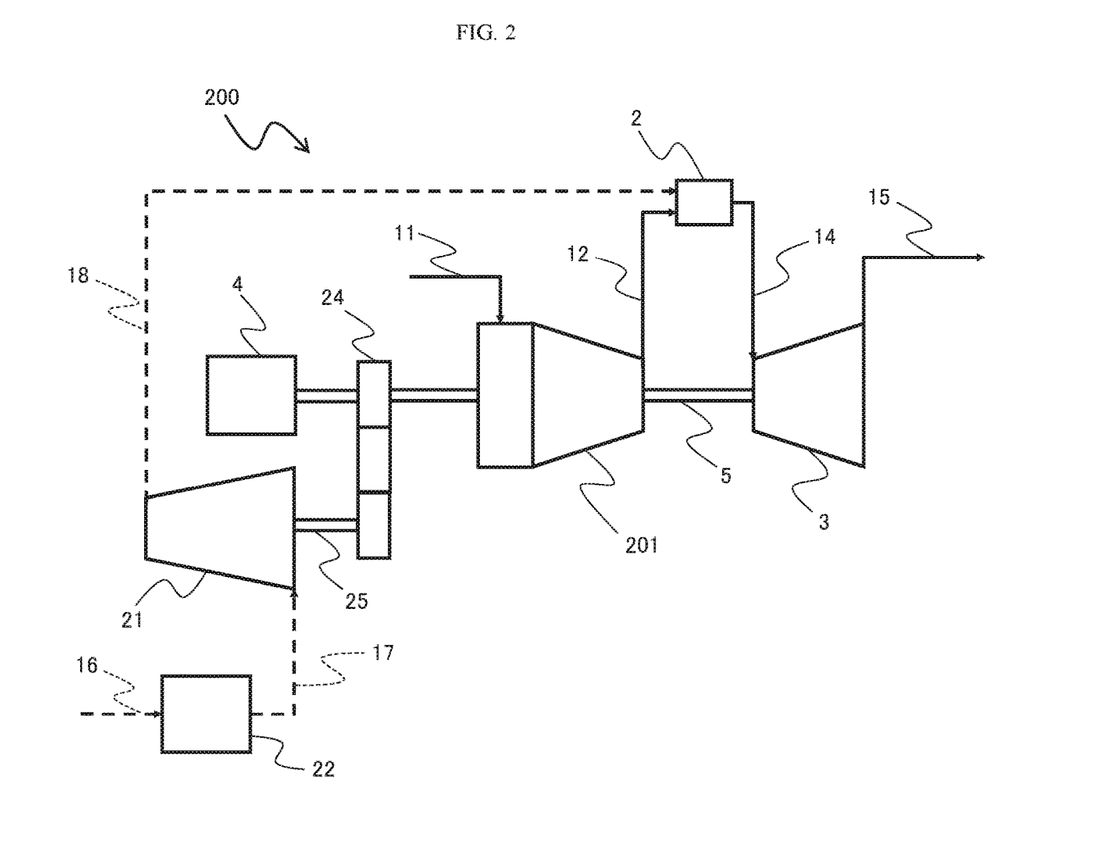
FIG. 2 is a schematic diagram of a blast furnace gas turbine according to the first embodiment of the present invention.

FIG. 2 is a schematic diagram of a blast furnace gas turbine according to this embodiment. In FIG. 2, portions equivalent to the portions of the reference machine 100 shown in FIG. 1 are denoted by the same reference numerals and explanation of the portions is omitted as appropriate. As shown in FIG. 2, a blast furnace gas turbine 200 includes a gas compressor 21, a wet electrostatic precipitator 22, and a gear 24 in addition to the components of the reference machine 100.

Blast furnace gas 16 generated in a large quantity in an ironworks or the like has characteristics that, for example, the blast furnace gas 16 has a low calorie and a low gas pressure and contains a lot of impurities. It is difficult to directly supply the blast furnace gas 16 to the combustor 2. Therefore, the blast furnace gas 16 is supplied to the combustor 2 through the wet electrostatic precipitator 22, the gas compressor 21, and the like. Specifically, the wet electrostatic precipitator 22 removes impurities (dust, etc.) of the supplied blast furnace gas 16 to generate a low-pressure blast furnace gas 17 and supplies the low-pressure blast furnace gas 17 to the gas compressor 21. The gas compressor 21 compresses the low-pressure blast furnace gas 17 to generate a high-pressure blast furnace gas 18 and supplies the high-pressure blast furnace gas 18 to the combustor 2. The combustor 2 mixes and burns the compressed air 12 obtained from a derivative compressor 201 and the high-pressure blast furnace gas 18, generates the high-temperature combustion gas 14, and supplies the high-temperature combustion gas 14 to the turbine 3. The combustion gas 14 obtained from the combustor 2 expands, whereby the turbine 3 is driven. The derivative compressor 201 is driven by power obtained by the turbine 3. The generator 4 and the gas compressor 21 are driven by the remaining power. In this embodiment, the gear 24 is attached to the rotating shaft 5 between the derivative compressor 201 and the generator 4. The gas compressor 21 is connected to the gear 24 via the rotating shaft 25. That is, in this embodiment, the gas compressor 21 is coupled to the derivative compressor 201 in parallel to the generator 4 via the gear 24.

3. Design and Manufacturing of the Derivative Machine 3-1. Reference Compressor

Figure 3:
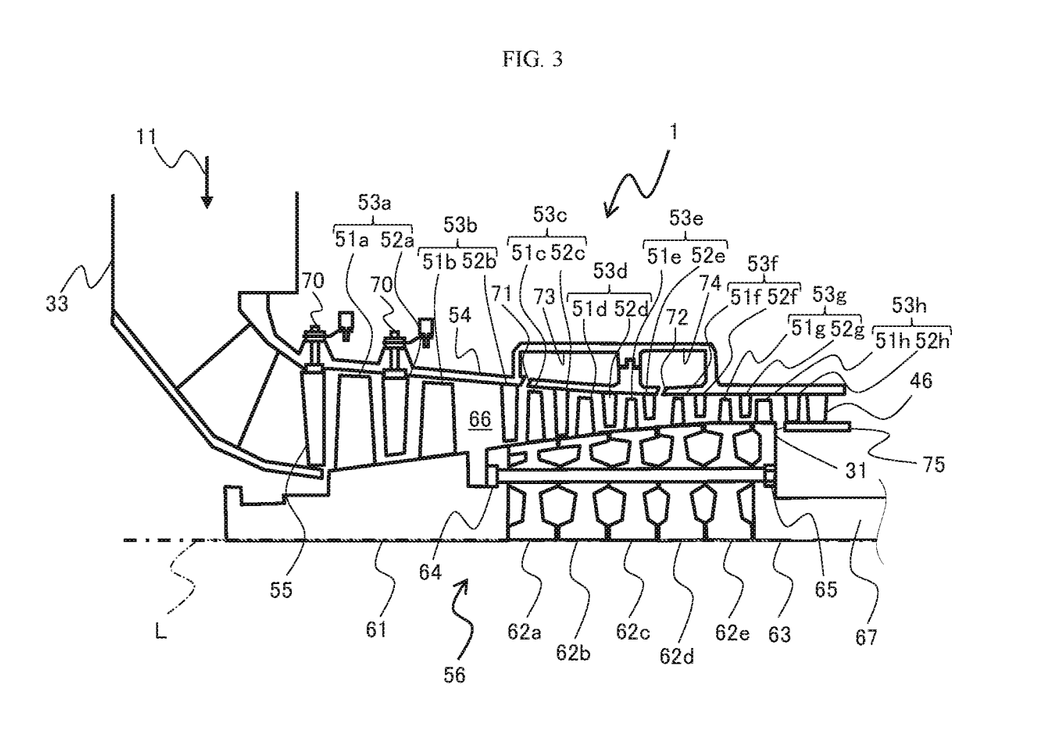
FIG. 3 is a schematic diagram showing an overall configuration of a configuration example of a reference compressor according to the first embodiment of the present invention.

FIG. 3 is a schematic diagram showing an overall configuration of a configuration example of the reference compressor 1 according to this embodiment. As shown in FIG. 3, the reference compressor 1 includes a casing 54, a stub shaft 61, disks 62a to 62e, a distance piece 63, rotor blades 51a to 51h, stator vanes 52a to 52h, and bleed chambers 73 and 74.

The casing 54 is a cylindrical member that forms the outer circumferential wall of the reference compressor 1. The stub shaft 61, the disks 62a to 62e, the distance piece 63, the rotor blades 51a to 51h, and the stator vanes 52a to 52h are housed in the casing 54.

The stub shaft 61 is disposed on an inlet side of the casing 54 (an upstream side in a flowing direction of the air 11). The disks 62a to 62e are disposed on a downstream side in the flowing direction of the air 11 with respect to the stub shaft 61. The distance piece 63 is disposed on the downstream side in the flowing direction of the air 11 with respect to the disks 62a to 62e. The distance piece 63 includes a connecting section 67 that extends to the turbine side and is coupled to a turbine rotor. The stub shaft 61, the disks 62a to 62e, and the distance piece 63 are disposed to be laid one on top of another in the flowing direction of the air 11 and integrally fastened by stacking bolts 64 and nuts 65. A plurality of stacking bolts 64 are provided at equal intervals on the same circumference centering on a center axis L of the reference compressor 1. The stub shaft 61, the disks 62a to 62e, and the distance piece 63 configure a rotor 56 in conjunction with the rotor blades 51a to 51h. Note that, in the configuration illustrated in FIG. 3, the reference compressor 1 includes five disks 62a to 62e. However, the number of disks may be six or more or four or less.

An annular compressor channel 66 is formed between the outer circumferential surfaces of the stub shaft 61, the disks 62a to 62e, and the distance piece 63 and the inner circumferential surface of the casing 54. That is, the compressor channel 66 has the inner circumferential surface of the casing 54 as an outer circumferential wall and has the outer circumferential surfaces of the stub shaft 61, the disks 62a to 62e, and the distance piece 63 as an inner circumferential wall. The air 11 sucked by the reference compressor 1 is compressed in a process in which the air 11 passes through the compressor channel 66.

A plurality of rotor blades 51a to 51h are respectively provided on the outer circumferential surfaces of the stub shaft 61, the disks 62a to 62e, and the distance piece 63 at equal intervals along the circumferential direction of the rotor 56. The rotor blades 51a to 51h extend from the outer circumferential surfaces of the stub shaft 61, the disks 62a to 62e, and the distance piece 63 toward the outer circumference side of the reference compressor 1 (the inner circumferential surface of the casing 54). Note that, in this embodiment, the rotor blades 51a and 51b are provided on the outer circumferential surface of the stub shaft 61, the rotor blades 51c to 51g are respectively provided on the outer circumferential surfaces of the disks 62a to 62e, and the rotor blade 51h is provided on the outer circumferential surface of the distance piece 63. The rotor blades 51a to 51h rotate clockwise when viewed from the downstream side around the center axis L together with the stub shaft 61, the disks 62a to 62e, and the distance piece 63 with power obtained by the turbine.

A plurality of stator vanes 52a to 52h are respectively provided on the inner circumferential surface of the casing 54 at equal intervals along the circumferential direction of the rotor 56. The stator vanes 52a to 52h extend from the inner circumferential surface of the casing 54 toward the inner circumference side of the reference compressor 1 (the outer circumferential surfaces of the stub shaft 61, the disks 62a to 62e, and the distance piece 63). In this embodiment, the stator vane 52a is provided on the inner circumferential surface of the casing 54 via a variable mechanism 70. That is, the stator vane 52a is provided to be rotatable in the compressor channel 66 around an axis extending in a blade length direction and has a function of suppressing a rotating stall during turbine start. Note that, in the illustration in this embodiment, the stator vane 52a is provided on the inner circumferential surface of the casing 54 via the variable mechanism 70. However, a plurality of stator vanes may be provided on the inner circumferential surface of the casing 54 via the variable mechanism 70.

The rotor blades 51a to 51h and the stator vanes 52a to 52h are alternately provided in the flowing direction of the air 11. That is, the rotor blades and the stator vanes are alternately provided in the order of the rotor blade 51a, the stator vane 52a, the rotor blade 51b, the stator vane 52b, and the like from an inlet of the compressor channel 66 toward the downstream side. One set of the rotor blade and the stator vane (the stator vane is on the downstream side of the rotor blade) adjacent to each other in the flowing direction of the air 11 configures a blade stage. In the configuration illustrated in FIG. 3, the rotor blades 51a to 51h and the stator vanes 52a to 52h configure a first blade stage 53a to an eighth blade stage 53h from the inlet of the compressor channel 66. Note that, in the following explanation, in some case, the first blade stage 53a is referred to as initial stage and the eighth blade stage 53h is referred to as last stage.

Inlet guide vanes (IGVs) 55 are provided on the upstream side in the flowing direction of the air 11 with respect to the rotor blade 51a of the initial stage 53a. A plurality of IGVs 55 are provided on the inner circumferential surface of the casing 54 via the variable mechanism 70 at equal intervals along the circumferential direction of the rotor 56. The IGVs 55 have a function of controlling an intake flow rate of the air 11 and adjusting a turbine load. Exit guide vanes 46 are provided on the downstream side in the flowing direction of the air 11 with respect to the stator vane 52h of the last stage 53h. Note that, in the illustration in this embodiment, the exit guide vanes 46 are provided in one row. However, the exit guide vanes 46 may be provided in a plurality of rows in the flowing direction of the air 11.

The bleed chambers 73 and 74 are provided side by side in the casing 54 in the flowing direction of the air 11. The bleed chambers 73 and 74 respectively include bleeds slits 71 and 72. The bleed chambers 73 and 74 communicate with the compressor channel 66 via the bleed slits 71 and 72. In this embodiment, the bleed slit 71 is opened to the compressor channel 66 between the stator vane 52b of the second blade stage 53b and the rotor blade 51c of the third blade stage 53c. The bleed slit 72 is opened to the compressor channel 66 between the stator vane 52e of the fifth blade stage 53e and the rotor blade 51f of the sixth blade stage 53f. That is, the bleed slit 72 is formed on the most downstream side of the compressor channel 66. Note that, in this embodiment, the configuration is illustrated in which the reference compressor 1 includes the two bleed chambers 73 and 74. However, a configuration may be adopted in which the reference compressor 1 includes one or three or more bleed chambers.

A part of the air 11 passed through the stator vane 52b of the second blade stage 53b flows into the bleed chamber 73 via the bleed slit 71. A part of the air 11 passed through the stator vane 52e of the fifth blade stage 53e flows into the bleed chamber 74 via the bleed slit 72. The air (bleed air) flowed into the bleed chambers 73 and 74 is used as cooling air for the turbine blades and bearing seal air via a pipe (not shown in the figure) provided in the casing 54. During rated operation of the turbine, a part (e.g., approximately 4 to 5%) of an intake flow rate of the air 11 is used as the bleed air. During the start of the turbine, pressurized air in the compressor channel 66 is bled in order to avoid a rotating stall of the turbine blades. A part (e.g., approximately 30%) of the intake flow rate of the air 11 is emitted.

The bleed slits 71 and 72 of the bleed chambers 73 and 74 and the rotor blades 51c and 51f (i.e., the rotor blades provided in positions closest to the bleed slits 71 and 72 among the rotor blades further on the downstream side than the bleed slits 71 and 72) are desirably designed to reduce an overlap amount in the flowing direction of the air 11 in order to avoid resonance of a resonant frequency by the bleed chambers 73 and 74 and a natural frequency of the rotor blades 51c and 51f and reduce influence applied to the distal end portions in the blade length direction of the rotor blades 51c and 51f by a fluid fluctuation pressure in the bleed slits 71 and 72.

An inner circumferential bleed slit 31 is formed between the rotor blade 51h and the stator vane 52h of the last stage 53h. An inner circumferential bleed structure is formed on the inner circumference side of the compressor channel 66.

The air passed through the rotor blade 51*h* is bled in the inner circumferential bleed slit 31 and used as, for example, cooling air for the disks 62*a* to 62*e* and seal air for suppressing a leak flow of the air 11 from the compressor channel 66 to spaces among the disks 62*a* to 62*e*. In the inner circumferential bleed slit 31, unlike the bleed slits 71 and 72 of the bleed chambers 73 and 74, the air flows into a space between the rotor 56 rotating at high speed and a stationary body. Therefore, it is presumed that the flow is extremely complicated and a fluid fluctuation pressure increases with respect to the rotor blade 51*h* and the stator vane 52*h* of the last stage 53*h*. Therefore, the rotor blade 51*h* is designed such that blade rigidity is increased compared with the rotor blade 51*g* of the seventh blade stage 53*g*, which is a pre-stage. The stator vane 52*h* is also designed such that blade rigidity is increased by providing a shroud 75 on the inner circumferential side.

The air 11 flowed in via the intake section (not shown in the figure) turns the flow in a direction around a rotation axis L along the shape of an intake plenum 33 provided on the upstream side of the reference compressor 1 (in the configuration illustrated in FIG. 3, the air 11 turns 90 degrees along the shape of the intake plenum 33) and flows into the compressor channel 66. The air 11 flowed into the compressor channel 66 is given kinetic energy by the rotor blades rotating around the center axis L and flows out from the rotor blades in a state in which total pressure and total temperature rise. The air 11 flowed out from the rotor blades turns the flow in a direction along the shape of the stator vanes on the downstream side. At this point, since the air 11 is decelerated to speed lower than speed at the time when the air 11 flows into the stator vanes, the kinetic energy given by the rotor blades is converted into pressure. As a result, the pressure of the air 11 rises. Thereafter, the air 11 is pressurized by the rotor blades and the stator vanes alternately arrayed in the flowing direction of the air 11. In this way, a pressure gradient is opposite to the flow of the air 11 in the compressor channel 66. Therefore, the air 11 more easily peels from the blade surface as the air 11 further flows to the downstream side in the compressor channel 66.

3-2. Examination Concerning Reference Machine Diversion

It is assumed that the reference compressor 1 is directly diverted on the basis of the reference machine 100 to manufacture a blast furnace gas turbine.

Figure 4:
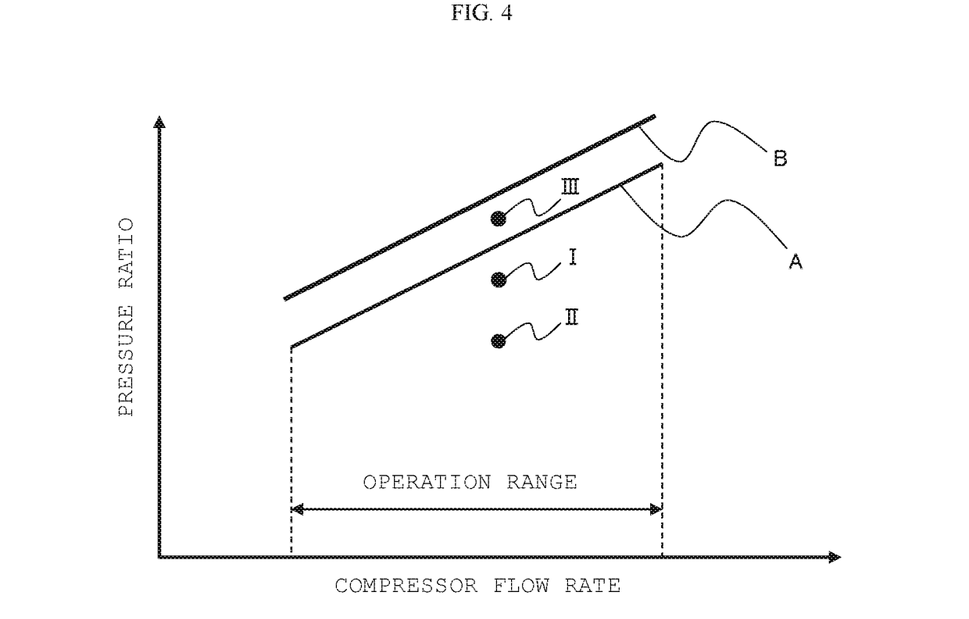
FIG. 4 is a diagram illustrating a relation between a compressor flow rate and a pressure ratio of a blast furnace gas turbine manufactured by directly diverting the reference compressor.

FIG. 4 is a diagram illustrating a relation between a compressor flow rate and a pressure ratio of the blast furnace gas turbine manufactured by directly diverting the reference compressor 1. A line A indicates a critical pressure ratio at which a surge margin can be secured with respect to the compressor flow rate in an operation range. If the blast furnace gas turbine operates at an operating point I present further on the lower side (a low pressure ratio side) than the line A, there is a sufficient surge margin. If a calorie of a blast furnace gas increases to be larger than when the blast furnace gas turbine operates at the operating point I, a flow rate of a combustion gas supplied to the turbine decreases when a fuel flow rate is reduced in order to keep a turbine output constant. Therefore, if the compressor flow rate is maintained, a pressure ratio of the reference compressor 1 decreases and the operating point falls from the point I to a point II. However, if the calorie of the blast furnace gas decreases to be smaller than when the blast furnace gas turbine operates at the operating point I, the flow rate of the combustion gas supplied to the turbine increases when the fuel flow rate is increased in order to keep the turbine output constant. Therefore, the pressure ratio of the reference compressor 1 increases and the operating point rises from the point I to a point III exceeding the line A. In this way, when the blast furnace gas turbine operates at the operating point III further on the upper side (a high pressure ratio side) than the line A, it is likely that surging of the reference compressor 1 occurs. In the case of an existing facility, when it is taken into account that a surge margin decreases because of a change in the atmospheric temperature, soil of the rotor blades and the stator vanes of the compressor due to aged deterioration, and the like, if the working point can be the point III, sufficient reliability of a gas turbine facility is not obtained. Further, because of the influence of impurities included in the blast furnace gas, it is likely that the gas compressor that pressurizes the blast furnace gas is exposed to a corrosion environment and the power of the gas compressor increases because the rotor blades and the stator vanes of the gas compressor are soiled. In that case, it is also likely that the pressure ratio of the reference compressor 1 increases and the surge margin decreases when the fuel flow rate is increased in order to keep the turbine output constant.

Therefore, it is important to manufacture the derivative compressor to raise the critical pressure ratio of the surge margin to a pressure ratio side higher than the pressure ratio of the reference compressor 1 (in the case illustrated in FIG. 4, raise the critical pressure ratio of the surge margin from the line A to a line B) while raising a pressure ratio to be higher than the pressure ratio of the reference compressor 1.

3-3. Manufacturing of the Derivative Compressor

Figure 5:
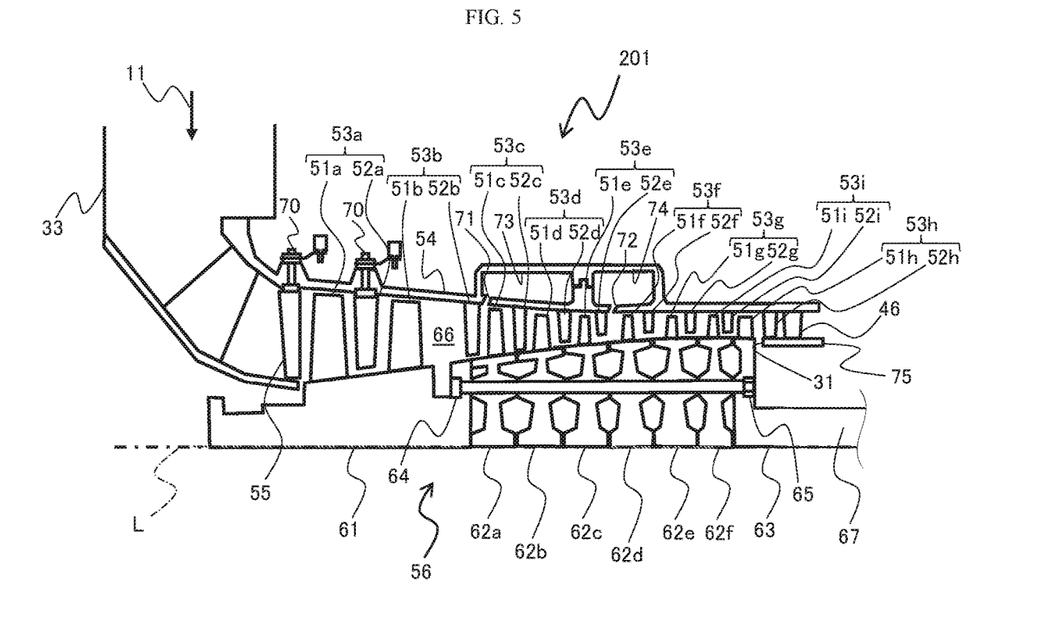
FIG. 5 is a schematic diagram showing an overall configuration of a configuration example of a derivative compressor according to the first embodiment of the present invention.
Figure 6:
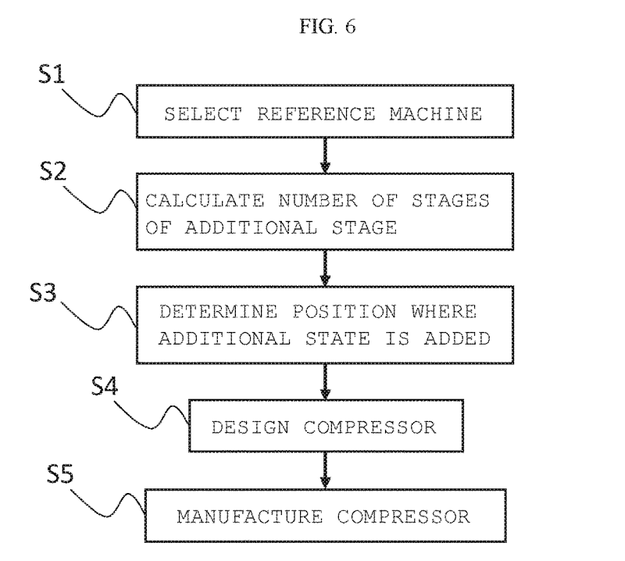
FIG. 6 is a flowchart showing a manufacturing procedure for the derivative compressor according to the first embodiment of the present invention.

FIG. 5 is a schematic diagram showing an overall configuration of a configuration example of the derivative compressor 201 according to this embodiment. FIG. 6 is a flowchart showing a manufacturing procedure of the derivative compressor 201 according to this embodiment. In FIG. 5, portions equivalent to the portions of the reference compressor 1 are denoted by the same reference numerals and signs and explanation of the portions is omitted as appropriate. A design and manufacturing procedure of the derivative compressor 201 is explained below.

Step S1

The reference machine 100 is selected. For example, a model of a turbine output same as a turbine output required of the derivative machine 200 only has to be selected as the reference machine 100. Note that, when the derivative machine is manufactured from the existing reference machine, this step is omitted.

Step S2

The number of stages of the additional stage added to the reference compressor 1 is calculated. In this embodiment, the number of stages of the additional stage is calculated on the basis of an increase value of a pressure ratio in the derivative compressor 201 due to fluctuation in the composition of the fuel. Specifically, a fluctuation width of the pressure ratio due to the fluctuation in the composition of the fuel is estimated. The number of stages of the additional stage is calculated such that a critical pressure ratio is larger than the increase value of the pressure ratio. For example, when the fluctuation width of the pressure ratio due to the fluctuation in the composition of the fuel is estimated to be approximately ±3 to 5%, maximum fluctuation in the increase value of the pressure ratio is approximately 5%. Therefore, when it is taken into account that a stage pressure ratio near a last stage of a normal reference compressor is approximately 1.1, the number of stages of the additional stage is calculated as one to two, although being affected by the pressure ratio of the entire reference compressor.

Step S3.

A position where the additional stage is added is determined. In this embodiment, the additional stage is added to a position that satisfies a requirement (i) described below.

Figure 7:
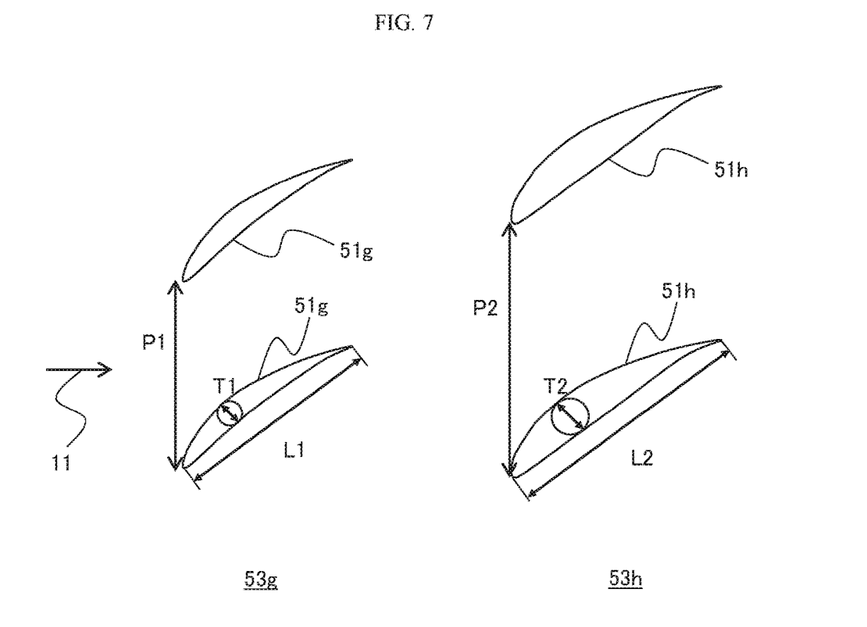
FIG. 7 is a schematic diagram of rotor blades of a seventh blade stage and a last stage of the reference compressor according to the first embodiment of the present invention.
Figure 8:
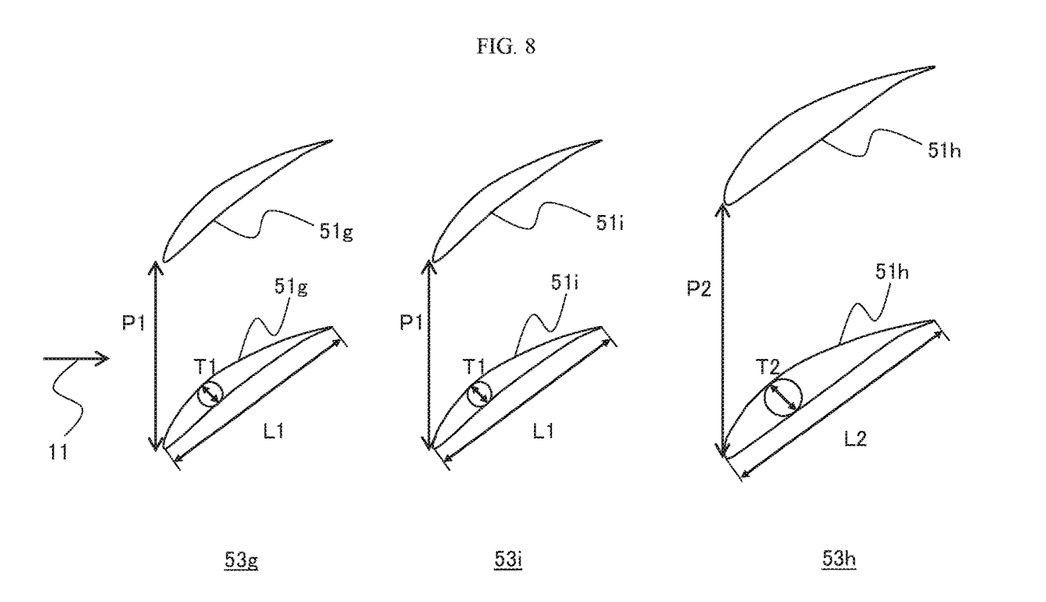
FIG. 8 is a schematic diagram of rotor blades of the seventh blade stage, an additional stage, and the last stage of the derivative compressor according to the first embodiment of the present invention.

(i) Between the last stage of the reference compressor and a blade stage immediately preceding the last stage Reason FIG. 7 is a schematic diagram of the rotor blades 51g and 51h of the seventh blade stage 53g and the last stage 53h of the reference compressor 1 according to this embodiment. FIG. 8 is a schematic diagram of the rotor blade 51g, a rotor blade 51i, and the rotor blade 51h of the seventh blade stage 53g, an additional stage 53i, and the last stage 53h of the derivative compressor 201 according to this embodiment.

As explained above, in this embodiment, the blade rigidity of the rotor blade 51h of the last stage 53h is set high compared with the blade rigidity of the rotor blade 51g of the upper stage (the seventh blade stage 53g). Specifically, as shown in FIG. 7, when maximum thicknesses of the rotor blades 51g and 51h are represented as T1 and T2 and blade chord lengths of the rotor blades 51g and 51h are represented as L1 and L2, the rotor blades 51g and 51h are formed such that T1<T2 and L1<L2. When blade pitch lengths (elements corresponding to the number of blades along the circumferential direction of the rotor 56) of the rotor blades 51g and 51h are represented as P1 and P2, the rotor blades 51g and 51h are provided such that solidities (ratios L1/P1 and L2/P2 of the blade chord lengths L1 and L2 and the blade pitch lengths P1 and P2) of the rotor blades 51g and 51h are substantially equivalent. That is, the rotor blades 51g and 51h are provided such that the number of blades of the rotor blade 51h along the circumferential direction of the rotor 56 is smaller than the number of blades of the rotor blade 51h.

If the additional stage 53i is added to the downstream side of the last stage 53h, when inner circumferential bleed is taken into account, the maximum thickness of the rotor blade 51i of the additional stage 53i needs to be set to T2 and the blade chord length of the rotor blade 51i needs to be set to L2. However, when the maximum thickness is increased, compressor efficiency is deteriorated because a blade aerodynamic loss increases. On the other hand, when the maximum thickness of the rotor blade 51i of the additional stage 53i is set to T1 and the blade chord length of the rotor blade 51i is set to L1 in order to suppress the blade aerodynamic loss, it is likely that the rotor blade 51i of the additional stage 53i is damaged by the influence of a fluid fluctuation pressure due to the inner circumferential bleed. Further, when the additional stage 53i is added to the downstream side of the last stage 53h, structures such as a spigot section, a stacking bolt fastening section, and a rotor blade planting section of the distance piece 63, in which the rotor blade 51h is provided, need to be changed. Therefore, cost and a design period increase. If the additional stage 53i is added to the downstream side of the last stage 53h and the blade chord length and the maximum blade thickness of the rotor blade 51h of the last stage 53h are set to L1 and T1, the solidity (L1/P2) is small compared with when the blade chord length and the maximum blade thickness are set to L2 and T2. Then, since a loading on the blade increases and the blade aerodynamic loss increases, the compressor efficiency is deteriorated.

On the other hand, in general, an axial-flow compressor is configured such that a compressor channel decreases downstream from an initial stage. Therefore, for example, if an additional stage is added to the downstream side of the compressor channel as far as possible, it is possible to reduce the length of the rotor blade 51i of the additional stage 53i.

Therefore, in this embodiment, the additional stage 53i is added between the last stage 53h and the stage (the seventh blade stage 53g) immediately preceding the last state 53h. As shown in FIG. 8, the maximum blade thickness and the blade chord length of the rotor blade 51i of the additional stage 53i are set to T1 and L1. Note that the stator vane 52g and the like of the seventh blade stage 53g may be diverted to a stator vane 52i of the additional stage 53i.

When the reference compressor includes a region where the inner diameter and the outer diameter of the compressor channel are fixed, an additional stage may be further added to a position that satisfies a requirement (ii) described below.

(ii) A region on the upstream side of the last stage of the reference compressor where the inner diameter and the outer diameter of the compressor channel are fixed Reason In general, since boundary layers grow on the inner circumferential wall and the outer circumferential wall of the compressor channel of the reference compressor, a secondary flow loss increases on a downstream stage side of the reference compressor. Therefore, on the downstream stage side of the reference compressor, an aspect ratio, which is a ratio of a blade length and a blade chord length, needs to be set to a fixed value (e.g., 1.2) or more. Since the air has high temperature on the downstream stage side of the reference compressor, when a start to a rated operation time and a stop time of the turbine are taken into account, a time difference occurs between thermal elongation amounts of a rotor and a casing because of a difference between heat capacities of the rotor and the casing. In particular, when the thermal elongation amount of the casing decreases earlier than the thermal elongation amount of the rotor during the stop of the turbine, it is likely that the rotor blades and the inner circumferential surface of the casing come into contact with each other and the rotor blades are damaged. On the other hand, when a sufficient clearance is secured between the distal end portions in the blade length direction of the rotor blades and the inner circumferential surface of the casing, it is likely that the clearance increases during the rated operation of the turbine and the compressor efficiency is deteriorated. Therefore, it is necessary to set the clearance to an optimum value. Therefore, on the downstream stage side of the reference compressor, it is useful to fix the inner diameter and the outer diameter of the compressor channel such that the clearance between the distal end portions in the blade length direction of the rotor blades and the stator vanes and the inner circumferential surface of the casing can be easily set.

This is because, when the reference compressor includes a region where the inner diameter and the outer diameter of the compressor channel are fixed, if an additional stage is added on the upstream side of the last stage of the reference compressor and in this region, the blade stage of the reference compressor can be diverted to the additional stage.

When the reference compressor includes a bleed slit, an additional stage may be further added to a position that satisfies a requirement (iii) described below.

(iii) Further on the upstream side than the last stage of the reference compressor and on the downstream side of a bleed slit of the bleed chamber Reason When the reference compressor includes a bleed slit, if the additional stage is added further on the upstream side than the bleed slit, the position of the bleed slit needs to be changed. Therefore, components (e.g., the casing 54) around the bleed slit 72 needs to be changed. Then, cost and a design period increase.

Therefore, when the reference compressor includes the bleed slit, the additional stage is added further on the upstream side than the last stage of the reference compressor and on the downstream side of the bleed slit. Note that, when the reference compressor includes a plurality of bleed slits, because of the reason explained above, the additional stage is added further on the upstream side than the last stage of the reference compressor and on the downstream side of the bleed slit.

On the other hand, when the additional stage is added on the upstream side of the last stage of the reference compressor and on the downstream side of the bleed slit on the most downstream side, it is likely that a differential pressure (which takes into account a pipe pressure loss and a blade cooling pressure loss) between the air on the compressor side and the air on the turbine side of the turbine glade cooling air cannot be secured. In that case, the bleed slit only has to be moved to the downstream side to make it possible to supply the turbine blade cooling air having an optimum differential pressure such that the differential pressure, which takes into account the pipe pressure loss and the blade cooling pressure loss, can be secured. With such a configuration, it is possible to reduce a cooling air amount and improve efficiency of the gas turbine.

In the configuration illustrated in FIG. 5, the reference compressor 1 illustrated in FIG. 3 includes the region (the sixth blade stage 53$f$ to the seventh blade stage 53$g$) where the inner diameter and the outer diameter of the compressor channel 66 are fixed and includes the plurality of bleed slits 71 and 72. Therefore, the additional stage 53$i$ including the rotor blade 51$i$, the stator vane 52$i$, and a disk 62$f$ is added, between the last stage 53$h$ and the blade stage 53$g$ immediately preceding the last stage 53$h$, in the region where the inner diameter and the outer diameter of the compressor channel 66 are fixed and on the downstream side of the bleed slit 72 provided on the most downstream side. Note that FIG. 5 illustrates the configuration in which one additional stage is added. However, when two or more additional stages are added, the additional stages only have to be added in positions that satisfy the requirements (i) to (iii) describe above.

Step S4

Among the components (e.g., the casing 54, the stub shaft 61, the disks 62$a$ to 62$e$, the distance piece 63, the rotor blades 51$a$ to 51$h$, and the stator vanes 52$a$ to 52$h$) of the reference compressor 1, the components deviating from the specifications according to the addition of the additional stage 53$i$ in step S3 are updated to meet the specifications. The components having common specifications are diverted to design the derivative compressor 201. Note that, in this embodiment, the specifications are required matters that the components should meet.

(a) Components to be Updated

In the configuration illustrated in FIG. 5, it is necessary to extend the rotor 56 in the flowing direction of the air 11 by adding the additional stage 53$i$. On the other hand, when vibration of the rotor 56 is suppressed to secure reliability of the derivative compressor 201, the length of the rotor 56 is sometimes limited. On the other hand, in this embodiment, the connecting section 67 to the turbine side of the distance piece 63 is reduced in length by the length of the additional stage 53$i$. That is, the length between the derivative compressor 201 and the turbine is reduced by the length of the additional stage 53$i$.

Further, in the configuration illustrated in FIG. 5, the casing 54 is extended in the flowing direction of the air 11 by the length of the additional stage 53$i$.

(b) Components to be Diverted

In the configuration illustrated in FIG. 5, the disk 62$f$ of the additional stage 53$i$ is formed in structure same as the structure of the disk 62$e$ of the pre-stage (the seventh blade stage 53$g$) of the last stage 53$h$. The rotor blade 51$i$ of the additional stage 53$i$ is formed in a shape same as the shape of the rotor blade 51$g$ of the pre-stage (the seventh blade stage 53$g$) of the additional stage 53$i$.

Further, in the configuration illustrated in FIG. 5, the stator vane 52$h$ of the last stage 53$h$ and the exit guide vane 46 of the reference compressor 1 are diverted. Detailed explanation follows below.

Figure 9:
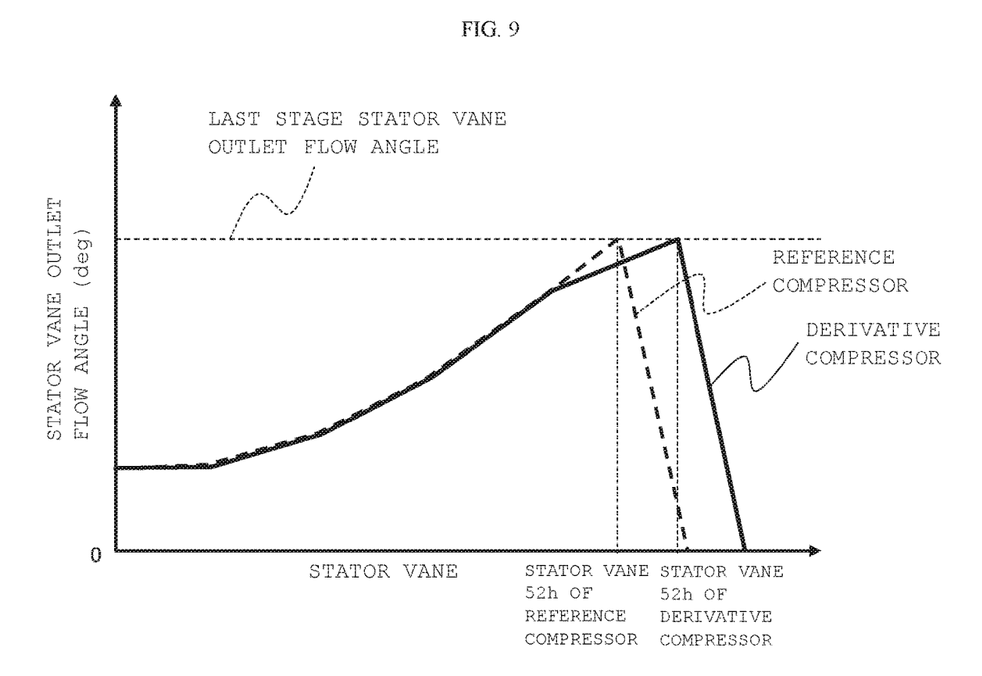
FIG. 9 is a diagram showing outlet flow angle distributions of stator vanes of the reference compressor and the derivative compressor according to the first embodiment of the present invention.

FIG. 9 is a diagram showing outlet flow angle distributions of the stator vanes of the reference compressor 1 and the derivative compressor 201 according to this embodiment.

In general, in a compressor, since a flow of the air is turned by stator vanes, an outlet flow angle of the stator vanes is larger further on a downstream stage side. Therefore, as shown in FIG. 9, the outlet flow angle of the stator vanes is the maximum in the stator vane 52$h$ of the last stage 53$h$ in both of the reference compressor 1 and the derivative compressor 201. The air 11 passed through the rotor blade 51$h$ of the last stage 53$h$ turns the flow in the stator vane 52$h$. A turning component of the air 11 is reduced to zero by the exit guide vane 46 provided on the downstream side of the stator vane 52$h$. The air 11 is supplied to a diffuser provided on the downstream side.

In this embodiment, the additional stage 53$i$ is added further on the upstream side than the last stage 53$h$. The outlet flow angle of the stator vane 52$h$ of the last stage 53$h$ is set the same before and after the additional stage 53$i$ is added. Therefore, a turning angle of the exit guide vane of the derivative compressor 201 can be set the same as the turning angle of the exit guide vane 46 of the reference compressor 1. Therefore, it is considered that there is appropriateness in diverting the stator vane 52$h$ of the last stage 53$h$ and the exit guide vane 46 of the reference compressor 1 to the stator vane of the last stage and the exit guide vane of the derivative compressor 201.

Step S5

The derivative compressor 201 is manufactured on the basis of the design in step S4. Note that, when the derivative machine is manufactured from the existing reference machine, the components illustrated in (a) in step S4 only has to be updated and incorporated in the reference compressor of the existing reference machine.

Note that the derivative machine 200 is manufactured using the derivative compressor 201 manufactured in step S4.

(Effects)

(1) In this embodiment, at least one additional stage 53$i$ is added between the last stage 53$h$ and the stage immediately preceding the last stage 53$h$ of the reference compressor 1 to design and manufacture the derivative compressor 201. Therefore, it is possible to increase a surge pressure ratio of the derivative compressor 201 compared with the reference compressor 1. It is possible to secure a surge margin of the compressor with respect to fluctuation in the composition of the fuel. Further, it is possible to suppress an increase in the size of the additional stage 53$i$.

(2) In this embodiment, when the reference compressor 1 includes the region where the inner diameter and the outer diameter of the compressor channel 66 are fixed, at least one additional stage 53$i$ is added on the upstream side of the last stage 53$h$ of the reference compressor 1 and in the region where the inner diameter and the outer diameter of the compressor channel 66 are fixed. Therefore, the additional stage 53i can be formed in structure same as the structure of a pre-stage and a post stage of the additional stage 53i. A blade stage actually used for design or manufacturing of the reference compressor 1 can be diverted to the additional stage 53i. Therefore, in addition to the effect explained above, it is possible to suppress an increase in cost. Concerning the blade stage diverted from the reference compressor 1, it is possible to secure reliability without performing verification or the like again. Therefore, it is also possible to reduce a design period.

(3) In this embodiment, at least one additional stage 53i is added further on the upstream side than the last stage 53h of the reference compressor 1 and on the downstream side of the bleed slit 72. Therefore, it is unnecessary to change the position of the bleed slit 72. Components actually used for the design or the manufacturing of the reference compressor 1 can be diverted to the components around the bleed slit 72. Therefore, in addition to the effects explained above, it is possible to suppress an increase in cost. Concerning the components diverted from the reference compressor 1, it is possible to secure reliability without performing verification or the like again. Therefore, it is also possible to reduce a design period.

(4) In this embodiment, the maximum blade thickness and the blade chord length of the rotor blade 51i of the additional stage 53i are set to T1 and L1. Therefore, for example, the rotor blade 51g of the pre-stage (the seventh blade stage 53g) of the additional stage 53i can be diverted to the rotor blade 51i. Therefore, it is possible to suppress deterioration in efficiency of the derivative compressor 201 and secure blade reliability. The blade chord length of the rotor blade 51i of the additional stage 53i is set shorter than the blade chord length of the rotor blade 51h of the last stage 53h. Therefore, it is possible to suppress an increase amount of the length of the rotor 56 due to the addition of the additional stage 53i and suppress vibration of the rotor 56.

(5) In this embodiment, the disk 62f of the additional stage 53i is formed in the structure same as the structure of the disk 62e of the pre-stage (the seventh blade stage 53g) of the last stage 53h of the reference compressor 1. The disk section of the distance piece of the derivative compressor 201 is formed in the structure same as the structure of the disk section of the distance piece 63 of the reference compressor 1. The rotor blade 51i of the additional stage 53i is formed in the shape same as the shape of the rotor blade 51g of the pre-stage (the seventh blade stage 53g). The stator vane 52h of the last stage 53h and the exit guide vane 46 of the reference compressor 1 are diverted to the derivative compressor 201. Therefore, concerning the components explained above of the derivative compressor 201, design and the like do not need to be performed anew. Therefore, it is possible to suppress an increase in cost. It is possible to secure reliability without performing verification and the like of the reliability again. Therefore, it is also possible to reduce a design period.

(6) In this embodiment, the connecting section 67 to the turbine side of the distance piece 63 can be reduced in length. Therefore, even when the length of the rotor 56 is limited, by reducing the connecting section 67 to the turbine side of the distance piece 63 in length by the length of the additional stage 53i, it is possible to add the additional stage 53i while minimizing updated parts of the components of the reference compressor 1.

Second Embodiment (Configuration)

Figure 10:
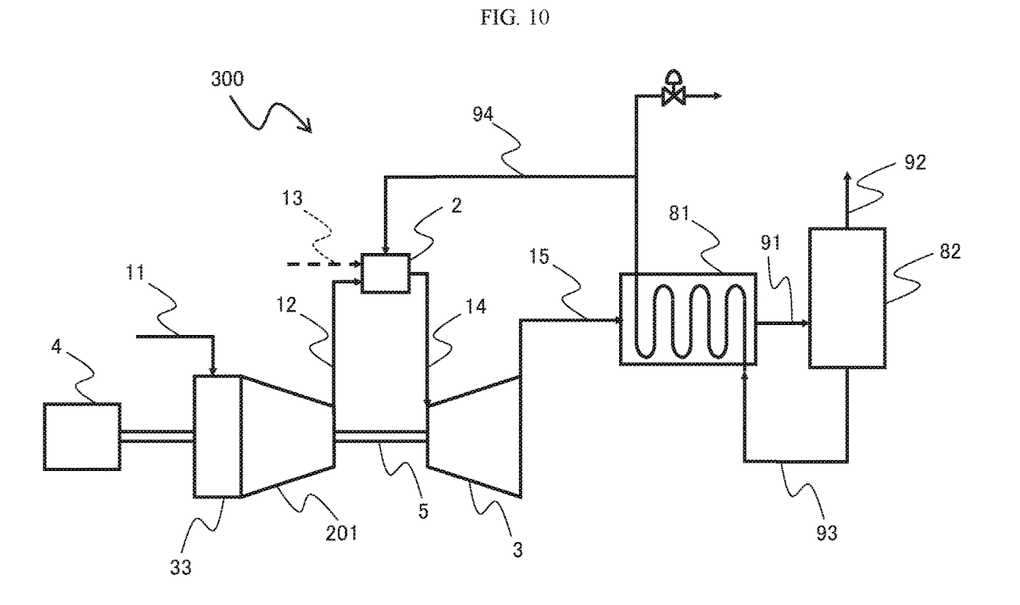
FIG. 10 is a schematic diagram of a gas turbine that uses steam of a heat recovery steam generator according to a second embodiment of the present invention.

FIG. 10 is a schematic diagram of a gas turbine that uses steam of a heat recovery steam generator (hereinafter, exhaust heat utilization gas turbine). The exhaust heat utilization gas turbine is configured to be capable of introducing the entire amount of steam energy of the heat recovery steam generator into the gas turbine. It is possible to obtain higher efficiency without using a steam turbine like the combined cycle. In FIG. 10, portions equivalent to the portions of the reference machine 100 shown in FIG. 1 are denoted by the same reference numerals and explanation of the portions is omitted as appropriate. As shown in FIG. 10, an exhaust heat utilization gas turbine 300 includes the derivative compressor 201 as a compressor and includes a heat recovery steam generator 81 and a water recovery system 82 in addition to the components of the reference machine 100.

The heat recovery steam generator 81 recovers exhaust heat from the exhaust gas 15 emitted from the turbine 3 and generates high-temperature stream 94 from moisture 93 supplied from the water recovery system 82. The heat recovery steam generator 81 ejects the generated high-temperature steam 94 to the combustor 2. The combustor 2 mixes and burns the ejected high-temperature steam 94 and the fuel 13, generates the high-temperature combustion gas 14, and supplies the high-temperature combustion gas 14 to the turbine 3. The combustion gas 14 that has driven the turbine 3 is emitted from the turbine 3 as the exhaust gas 15 and supplied to the heat recovery steam generator 81. The heat of the exhaust gas 15 supplied to the heat recovery steam generator 81 is recovered by heat exchange. The exhaust gas 15 is emitted from the heat recovery steam generator 81 as an exhaust gas 91. The exhaust gas 91 emitted from the heat recovery steam generator 81 is supplied to the water recovery system 82. The water recovery system 82 cools moisture content of the exhaust gas 91 with cooling water, condenses the moisture content, and recovers moisture. The exhaust gas 91, the moisture of which is recovered by the water recovery system 82, is emitted from the water recovery system 82 as an exhaust gas 92. The moisture 93 recovered by the water recovery system 82 is subjected to water treatment. Thereafter, a part of the moisture 93 is used for spray water in the water recovery system 82. A part of the moisture 93 is supplied to the heat recovery steam generator 81 and used for generation of the high-temperature steam 94.

(Effects)

If the reference compressor 1 is directly diverted to the compressor of the exhaust heat utilization gas turbine 300 illustrated by example in FIG. 10, the high-temperature steam 94 is ejected to the compressed air 12 obtained by the reference compressor 1. Therefore, a flow rate of the combustion gas 14 supplied to the turbine 3 increases compared with an intake flow rate of the reference compressor 1. Therefore, it is likely that the pressure ratio of the reference compressor 1 increases and the surge margin decreases. It is also likely that the surge margin decreases because of a change in the atmospheric temperature, soil of the rotor blades and the stator vanes of the compressor due to aged deterioration, and the like. Therefore, it is important to increase the critical pressure ratio of the surge margin further to a high pressure ratio side than in the reference compressor 1 and secure a sufficient surge margin.

On the other hand, as explained in the first embodiment, the derivative compressor 201 according to the present invention can secure the surge margin compared with the reference compressor 1 and secure reliability of the gas turbine. In this way, the present invention is not limited to the blast furnace turbine and can also be applied to an exhaust heat gas turbine without a problem. That is, an application target of the present invention is a gas turbine including an axial-flow compressor. A form of the gas turbine is not particularly limited.

<Others>

The present invention is not limited to the embodiments explained above and includes various modifications. For example, the embodiments are explained in detail in order to clearly explain the present invention. The embodiments are not always limited to embodiments including all the components explained above. For example, the components of another embodiment can also be added to the components of a certain embodiment. A part of the components of a certain embodiment can also be deleted.

In the illustration in the first embodiment, the additional stage 53i is added to the position that satisfies the requirement (i), the position that satisfies the requirements (i) and (ii), and the position that satisfies the requirements (i), (ii), and (iii). However, an essential effect of the present invention is to provide a gas turbine manufacturing method that can secure a surge margin of a compressor with respect to fluctuation in the composition of fuel. As long as the essential effect is obtained, the present invention is not always limited to the cases explained above. For example, the additional stage 53i may be added to a position that satisfies only the requirement (ii) and a position that satisfies only the requirement (iii). In short, the additional stage 53i can be added to a position that satisfies at least any one of the requirement (i), the requirement (ii), and the requirement (iii).

In the first embodiment, the configuration is illustrated in which the connecting section to the turbine side of the distance piece 63 is reduced in length by the length of the additional stage 53i. However, as long as the essential effect is obtained, the present invention is not always limited to the configuration. For example, the components further on the upstream side than the position where the additional stage 53i of the reference compressor 1 is added may be moved to the upstream side by the length of the additional stage 53i to add the additional stage 53i. In this case, since it is unnecessary to reduce the connecting section to the turbine side of the distance piece 63 in length, it is possible to divert the distance piece 63 of the reference compressor 1. The connecting section to the turbine side of the distance piece 63 may be reduced in length and, at the same time, the components further on the upstream side than the position where the additional stage 53i of the reference compressor 1 is added may be moved to the upstream side to secure a gap for the additional stage 53i in the entire rotor 56 and add the additional stage 53i.

DESCRIPTION OF REFERENCE NUMERALS 1 reference compressor
46 exit guide vane
51a to 51i rotor blade
52a to 52i stator vane
53a to 53h first blade stage to eighth blade stage (last stage)
53i additional stage
62a to 62f disk
63 distance piece
66 compressor channel
67 connecting section
71, 72 bleed slit
73, 74 bleed chamber
100 reference gas turbine (reference machine)
200 derivative gas turbine (derivative machine)
201 derivative compressor

The invention claimed is:

1. A gas turbine manufacturing method for manufacturing a derivative gas turbine having a different cycle from a reference gas turbine including a reference compressor, the gas turbine manufacturing method comprising:
   designing a compressor of the derivative gas turbine by adding at least one additional stage further on an upstream side than a last stage of the reference compressor and on a downstream side of a bleed slit of a bleed chamber of the reference compressor;
   manufacturing the compressor of the derivative gas turbine on the basis of the designed compressor; and
   designing and manufacturing the derivative gas turbine, wherein a connecting section to a turbine side of a distance piece that configures the last stage of a rotor of the reference compressor is reduced in length.

2. The gas turbine manufacturing method according to claim 1, wherein a disk of the at least one additional stage is formed in structure same as structure of a disk of a pre-stage of the last stage of the reference compressor.

3. The gas turbine manufacturing method according to claim 2, wherein a distance piece of the compressor of the derivative gas turbine is formed in structure same as structure of a distance piece of the last stage of the reference compressor.

4. The gas turbine manufacturing method according to claim 1, wherein the bleed slit is a bleed slit provided on a most downstream side among a plurality of the bleed slits provided in the reference compressor.

5. The gas turbine manufacturing method according to claim 1, wherein a position where the at least one additional stage is added is included in a region where an inner diameter and an outer diameter of a compressor channel are fixed.

6. The gas turbine manufacturing method according to claim 1, wherein a rotor blade of the at least one additional stage is formed in a shape same as a shape of a rotor blade of a pre-stage of the at least one additional stage.

7. The gas turbine manufacturing method according to claim 1, wherein a stator vane of the last stage and an exit guide vane of the reference compressor are used as a stator vane of the last stage and an exit guide vane of the derivative gas turbine.

8. The gas turbine manufacturing method according to claim 1, wherein a number of stages of the at least one additional stage is calculated on the basis of a pressure ratio increase value corresponding to fluctuation in a composition of fuel.

* * * * *